Oct. 9, 1923.  1,469,919
J. DONNIANNI ET AL
EDUCATIONAL AND AMUSEMENT DEVICE
Filed March 1, 1922
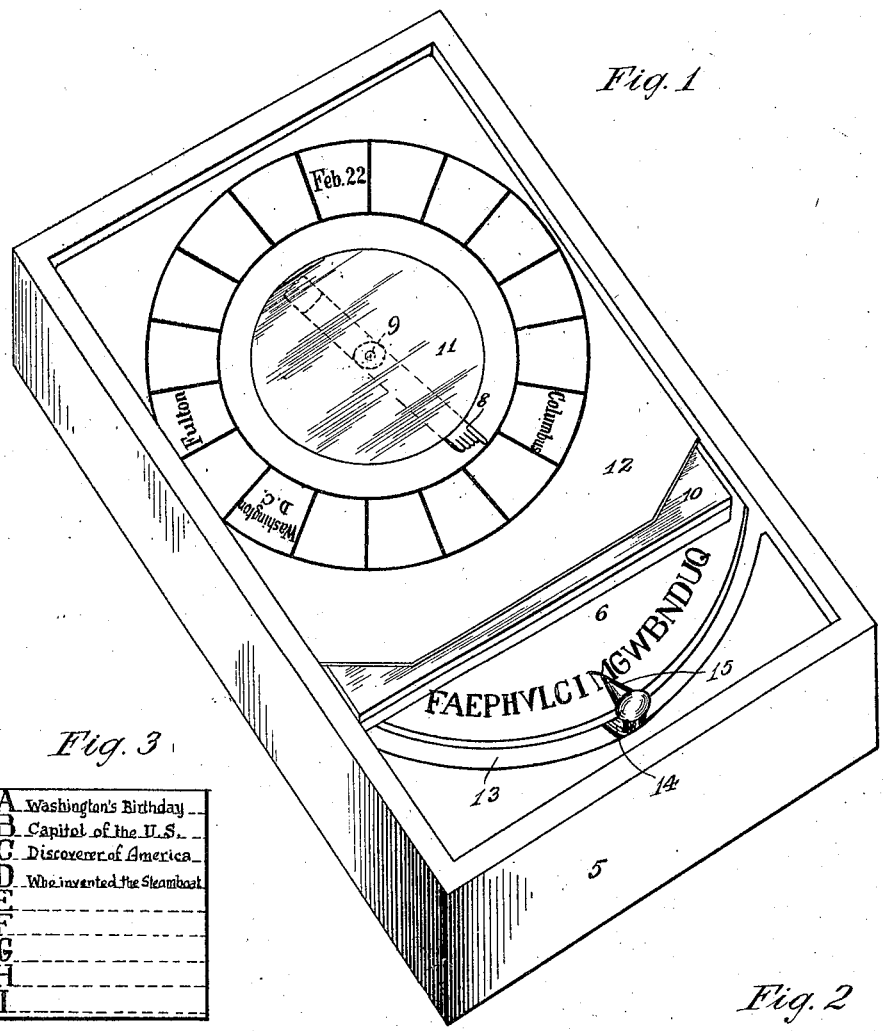
Fig. 1
Fig. 3
Fig. 2
INVENTOR.
James Donnianni and
Joseph Donnianni
BY
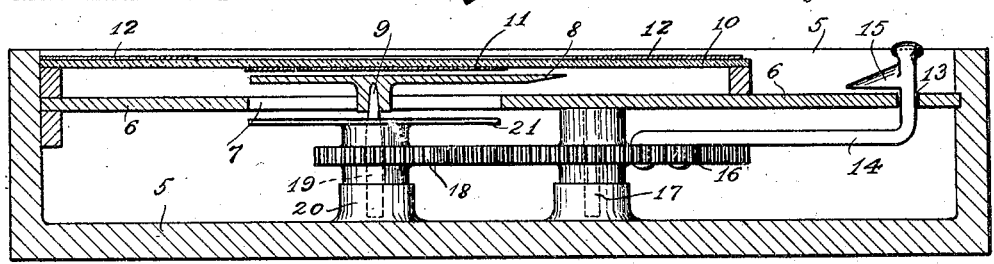
ATTORNEYS.

Patented Oct. 9, 1923.

1,469,919

UNITED STATES PATENT OFFICE.

JAMES DONNIANNI AND JOSEPH DONNIANNI, OF DANBURY, CONNECTICUT.

EDUCATIONAL AND AMUSEMENT DEVICE.

Application filed March 1, 1922. Serial No. 540,329.

*To all whom it may concern:*

Be it known that we, JAMES DONNIANNI and JOSEPH DONNIANNI, citizens of the United States, and residents of Danbury, in the county of Fairfield and State of Connecticut, have invented certain new and useful Improvements in Educational and Amusement Devices, of which the following is a specification.
Our invention relates to an educational and amusement device of a kind to be used in connection with a code of letters and questions, and whose operations when directed in accordance with said code will cause it to indicate answers to such questions.

The purpose of the invention is to provide a device which can be used for the amusement and enlightenment of both children and grown people and whereby an endless series of questions and answers may be used, and compiled to cover different fields of interest, and especially to employ letters of the alphabet in the code, and questions covering popular subjects of the day, together with their answers; further to construct the device in a simple and practical way so that it may be put out as an inexpensive and attractive commercial proposition, and for which additional records and reference code sheets may be required from time to time.

With these and other objects in view the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which, Fig. 1 shows a perspective view of our device as supported within a casing, the cover of which is removed;

Fig. 2 is a central vertical longitudinal section taken through the mechanism and casing as shown in Fig. 1; and Fig. 3 illustrates a code question sheet such as is read in connection with the answers to be indicated by the operation of the device.

The device briefly includes a dial that is divided into a series of sections, each containing specific information in condensed form which in substance is an answer to one of the questions printed upon the sheet to be read in connection with that particular dial. The question sheet also includes a series of letters which correspond with a similar series of letters printed upon the machine and to be indicated by a manually operated arm that is connected through rotatable gear mechanism to operate a pivoted pointer that swings around to register the several sections of the dial. The scheme of the play is to select questions on the code sheet which is designated by one of the letters, as for instance "A," meaning "What is the date of Washington's birthday?" and then adjust the arm to register with the "A" in the series of letters, whereupon the pointer will swing around to the section of the dial including the answer—namely "February 22."

Referring in detail to the characters of reference marked upon the drawings, 5 represents a box or casing including the mechanism and other parts of the apparatus, 6 indicates a horizontal partition supported on the side walls of the casing and provided with a hole 7 to accommodate the pointer 8 and the pivotal end 9 of a post 19 secured to the base. A glass covering plate 10 is supported above the partition 6 and in spaced relation thereto so as to provide a protective covering for the pointer and an enclosure for the top of the device. A non-transparent disk 11 is secured to the under side of this glass 10 immediately above the pointer and its pivotal post so as to cover all except the extreme end of the pointer which is extended to register with the sections of the dial 12 carrying the answers to the questions. These dials comprise rectangular printed sheets and as will be seen are cut out to form a central hole which registers with, but is somewhat larger than the non-transparent disk 11 before mentioned, the edges of the dial fitting against the rectangular frame of the box 5, so that the information-containing sections of the dial about the opening are correctly positioned.

The partition 6 is provided with an arc-shaped slot 13 through which the handled end portion of the arm 14 extends for the manual operation of the device and for the support of the finger 15 which registers with the several code letters in the circular series. The operating arm 14 is secured to a gear 16 mounted upon a shaft 17 supported in the hub on the base, and in the partition 6 before mentioned, so that with the swinging of the arm, the said gear is rocked backward and forward upon its shaft in a way to similarly rock the co-acting gear 18 with which it meshes. The gear 16 and arm 14 turn in about 90°, so that the gears 16 and 18 have a ratio of substantially 1 to 4. This last named gear is rotatably mounted upon the post 19, which is supported in the hub 20 on the base, the upper end of which forms the pintle 9 for the pointer before referred to.

A magnetized metal cross arm 21 is secured to the upper side of the gear 18 in a way to move with said gear and thus serves to attract and rotate the pointer 8 which is also magnetized and thus turns upon its pivot by magnetic attraction with the cross arm below. The effect of this operating connection as between the two parts is to afford a flexible operative connection for the needle, so as to insure a preliminary swinging or wobbling movement of the pointer preparatory to its final positioning, thus lending momentary uncertainty as to just where the needle is going to stop.

From the foregoing it will be seen that in order to operate the device it would first be necessary to select a dial and chart adapted to be read in connection with each other, then place the dial on the glass plate, and next position the arm to indicate the particular letter corresponding to that upon the code sheet and with which the questions to be answered align. Thereupon the pointer immediately swings around to the answer to the question selected, whereupon other questions may be worked out in the same way.

Having thus described our invention, what we claim and desire to secure by Letters Patent is:

In a device of the class described, the combination with a dial having an annular series of sections, each containing certain printed information, a magnetized pointer mounted centrally of the dial and pivoted to swing around and indicate one of the several sections of the dial, and operating means for the pointer, comprising a rotatable cross arm coaxially mounted with relation to the magnetized pointer, a gear coaxial and rotatable with said cross arm, a second gear meshing therewith, a radial arm upon said second gear adapted to be manually turned to rotate the cross arm and having an index pointer, and an arcuate index disposed in relation to said index pointer and having a series of reference characters positioned to be read in connection with and bearing specific relation to the sections of the dial.

Signed at Danbury, in the county of Fairfield and State of Connecticut this 24th day of February, A. D. 1922.

JAMES DONNIANNI.
JOSEPH DONNIANNI.

Witnesses:
CHAS. W. MURPHY,
THOMAS A. COLLINS.